United States Patent [19]
Richter

[11] Patent Number: 5,387,054
[45] Date of Patent: Feb. 7, 1995

[54] SCOURING SYSTEM FOR AUTOMATICALLY SCOURING AN EMPTY LIQUID RESERVOIR

[75] Inventor: Michael Richter, Taunusstein, Germany

[73] Assignee: Alloy-Tech Altiengesellschaft, Vaduz, Liechtenstein

[21] Appl. No.: 83,989

[22] Filed: Jun. 28, 1993

[30] Foreign Application Priority Data

Jul. 1, 1992 [DE] Germany .................. 4221569

[51] Int. Cl.[6] ...................... E02F 1/00; B08B 3/00
[52] U.S. Cl. ........................ 405/53; 134/169 R; 405/52; 405/36
[58] Field of Search ............. 405/52, 53, 36, 37, 405/43–48, 99; 134/169 R; 4/491

[56] References Cited

U.S. PATENT DOCUMENTS

| | | | |
|---|---|---|---|
| 4,522,535 | 6/1985 | Bastenhof | 405/79 |
| 4,892,440 | 1/1990 | Regan | 405/52 X |
| 4,905,325 | 3/1990 | Colditz | 134/169 R |
| 4,999,860 | 3/1991 | Chutter et al. | 405/79 X |
| 5,186,578 | 2/1993 | Perslow | 405/79 |
| 5,333,630 | 8/1994 | Jepsen et al. | 134/169 R X |

FOREIGN PATENT DOCUMENTS

3915076C2  5/1989  Germany .

OTHER PUBLICATIONS

Kompromisslos gut [Good Without Compromise] pp. 1–5, May, 1993.

*Primary Examiner*—Dennis L. Taylor
*Attorney, Agent, or Firm*—Friedrich Kueffner

[57] ABSTRACT

A scouring system for automatically scouring an empty liquid reservoir, for example, a flood basin, includes at least one scouring liquid chamber with a scouring opening in communication with a siphon-like scouring duct. Any liquid contained in the scouring liquid chamber is retained in the scouring liquid chamber by means of atmospheric pressure when the liquid level drops in the reservoir. An air inlet opening which can be closed by a ventilating valve is provided in the ceiling of the scouring liquid chamber. The ventilating valve includes a pressure box with a diaphragm which is deformed when compressed air is applied and closes the air inlet opening. A vacuum blower is connected to the scouring liquid chamber through an intake line and to the ventilating valve through a pressure line. The vacuum blower initially closes the ventilating valve, the scouring liquid chamber is evacuated and filled with scouring liquid. By actuating a solenoid valve, a pressure compensation is effected which facilitates entry of air into the scouring liquid chamber and releases a sudden flow from the scouring liquid chamber for scouring the reservoir.

4 Claims, 3 Drawing Sheets

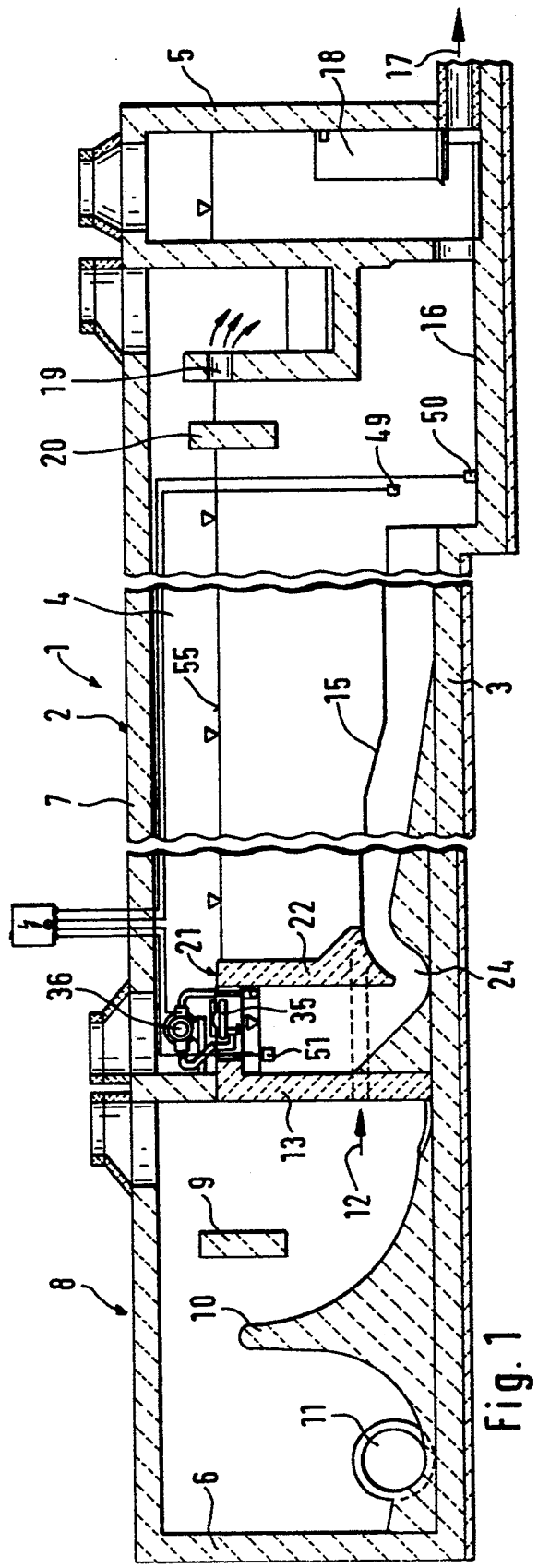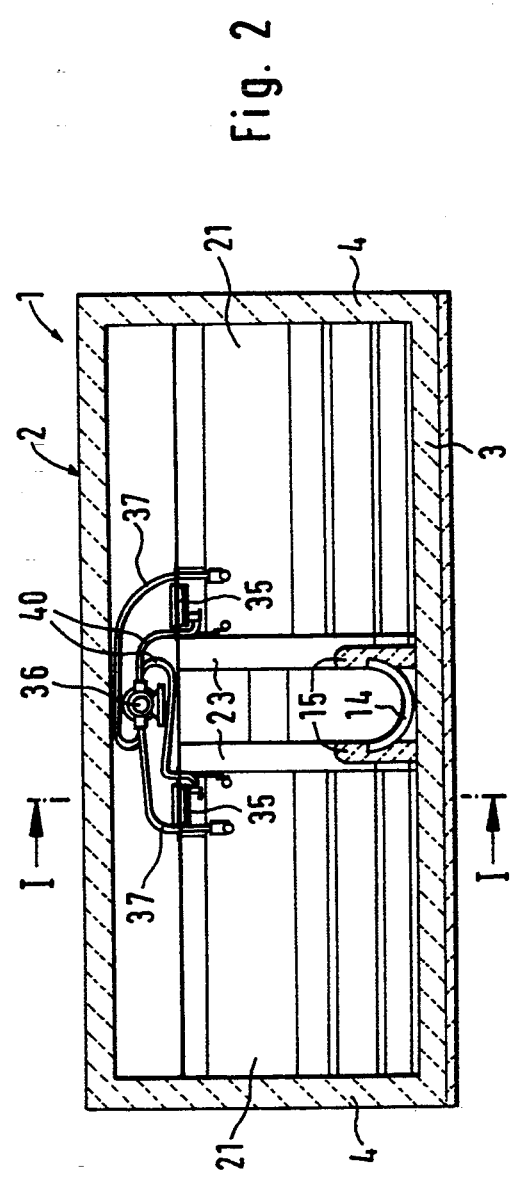

SCOURING SYSTEM FOR AUTOMATICALLY SCOURING AN EMPTY LIQUID RESERVOIR

BACKGROUND OF THE INVENTION

1. Field of the Invention

The present invention relates to a scouring system for automatically scouring a liquid reservoir which has been emptied, particularly a flood basin or a reservoir in a channel or sewer system. The scouring system includes at least one scouring liquid chamber arranged in the area of the highest point of the floor of the liquid reservoir. The scouring liquid chamber has a ceiling which closes the chamber in an air-tight manner. The scouring liquid chamber further has a scouring opening which is a siphon-like flow duct with an inlet opening facing the scouring liquid chamber and an outlet opening facing the liquid reservoir. The upper edge of the inlet opening is located below the lower edge of the outlet opening. The scouring liquid chamber has an outlet opening for air to be displaced during filling of the scouring liquid chamber. A check valve is provided at the air outlet opening of the scouring liquid chamber. The scouring liquid chamber further has an air inlet opening with a valve seat which can be closed by means of a valve member and can be released by the valve member for initiating a scouring procedure.

2. Description of the Related Art

In a scouring system of the above-described type disclosed in DE 39 15 076 C2, a pipe piece is arranged in the ceiling which closes the scouring liquid chamber in an air-tight manner. The pipe piece has an outlet opening for the air to be displaced during the filling of the scouring liquid chamber with scouring liquid and an air inlet opening. The outlet opening is provided with a check valve. The air inlet opening has a valve seat for a valve member for closing the air inlet opening and for releasing the air inlet into the scouring liquid chamber, wherein the valve member is connected to a float gauge in such a way that the float gauge and valve member move together.

This arrangement and the particular configuration of the outlet zone of the scouring liquid chamber make it possible that the scouring liquid is held back in the scouring liquid chamber not directly by mechanical closing means, such as flaps which close the scouring openings, but indirectly by atmospheric pressure which becomes effective automatically when the liquid level in the reservoir is lowered. The scouring procedure is effected by releasing the air inlet in the scouring liquid chamber.

Accordingly, the above-described known scouring system makes it possible to operate essentially without moving parts arranged below the level of the reservoir liquid which are subjected to the danger of contamination. However, the operation of the known scouring system is still not entirely secure because of the actuation of the valve member for the air inlet opening by means of a float gauge which requires that the filling of the scouring liquid chamber is dependent on the simultaneous filling of the reservoir.

SUMMARY OF THE INVENTION

Therefore, it is the primary object of the present invention to provide a scouring system of the above-described type in which it is possible to close and suddenly open the air inlet opening in a more simple and safer manner and in which filling of the scouring liquid chamber is independent of the filling of the reservoir.

In accordance with the present invention, the valve member for closing and releasing the air inlet opening is a diaphragm of an elastically deformable material which can be pressed by means of increased air pressure from the inside of the scouring liquid chamber against the valve seat so as to close the air inlet opening. In addition, a pressure compensating line which includes a control valve is provided between the space with the increased air pressure and the liquid reservoir.

The scouring system according to the present invention provides the advantage that, when pressure differences occur, the valve member rests quickly and tightly against the valve seat and reliably closes the air inlet opening. In addition, when a pressure compensation is carried out, the valve member is quickly released from the valve seat, so that the air inlet opening is completely opened very quickly. As a result, the scouring liquid held back in the scouring liquid chamber very suddenly flows out of the scouring liquid chamber, so that a strong scouring surge is created. The diaphragm forming the valve member can be arranged in such a way that the air pressure produced by filling the scouring liquid chamber and by displacing the air acts directly on the diaphragm.

In accordance with a particularly advantageous feature of the present invention, the diaphragm is part of a pressure box to which compressed air can be admitted separately in order to activate the diaphragm which forms the valve member.

If the diaphragm forms a valve which can be actively actuated as part of a pressure box, the present invention further provides that a vacuum blower can be connected to the scouring liquid chamber. Such a vacuum blower makes it possible to support and accelerate the filling of the scouring liquid chamber when the reservoir is filled simultaneously. However, the particular advantage of the vacuum blower is the fact that the scouring liquid chamber can take in liquid from an only partially filled reservoir, or water collected in an inlet chamber arranged in front of the reservoir, or even separately supplied water, as long as the water level in the outlet zone of the scouring liquid chamber is located above the lower edge of the outlet opening, i.e., the scouring opening is securely closed. As a result, the present invention makes it possible to carry out fully effective scouring procedures even if the reservoir is not filled or only partially filled.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described a preferred embodiment of the invention.

BRIEF DESCRIPTION OF THE DRAWINGS

In the drawing:

FIG. 1 is a longitudinal sectional view of a flood basin according to the present invention with a scouring liquid chamber;

FIG. 2 is a cross-sectional view of the flood basin of FIG. 1;

DETAILED DESCRIPTION OF THE PREFERRED EMBODIMENT

Figure 3:
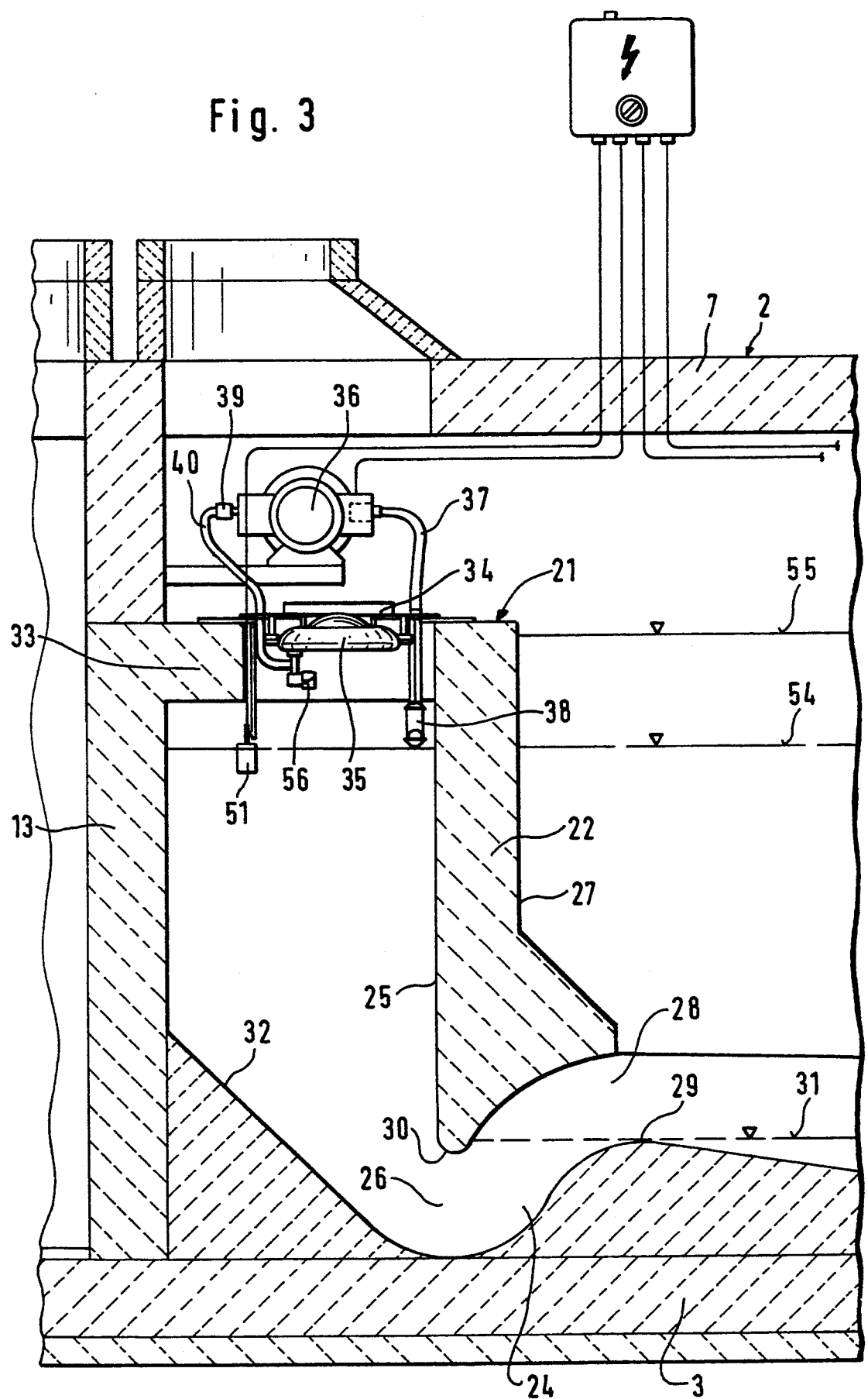
FIG. 3 is a partial sectional view, on a larger scale, of the scouring liquid chamber.

FIGS. 1 and 2 of the drawing show a flood basin 1 with a reservoir 2 shown in longitudinal cross-section and transverse cross-section, respectively, the flood basin 1 is composed of an essentially rectangular container of reinforced concrete having a basin bottom 3, longitudinal walls 4, end walls 5 and 6 and a ceiling 7. On the inlet side of the reservoir 2 is provided an inlet chamber 8 with an inlet, not shown, and an overflow crest 10 for a rain overflow 11 secured by a baffle wall 9.

The inlet 12 from the inlet chamber 8 to the reservoir 2 is provided in an intermediate wall 13 which divides the flood basin 1 over the entire height thereof. The inlet 12 opens into a channel 14 with lateral guide walls 15 for dry weather discharge. The channel 14 extends in the longitudinal center axis of the reservoir 2 and with downward inclination from the inlet 12. The channel 14 leads into a scouring sump 16 and from there into an outlet 17. A discharge quantity regulator 18 is provided in the conventional manner at the outlet 17. In order to avoid flooding, the reservoir 2 additionally has an overflow 19 with a baffle wall 20 arranged in front of the overflow 19. A scouring liquid chamber 21 each is provided on both sides of the channel 14 at the highest point of the bottom of the reservoir 2.

The scouring liquid chamber 21 is shown on a larger scale in FIG. 3 in a detail from FIG. 1. Each scouring liquid chamber 21 is rearwardly limited by the intermediate wall 13, and each scouring liquid chamber 21 is further defined by a front chamber wall 22, one of the inner side walls 23 and one of the outer walls 4 of the flood basin 1. Accordingly, the scouring liquid chambers 21 form part of the entire reinforced concrete structure. As is shown particularly in FIG. 3, a siphon-like flow duct or scouring duct 24 is provided in the lower area of each scouring liquid chamber 21. The scouring duct 24 has an inlet opening 26 for the scouring liquid which continues in the plane which extends from the inner surface 25 of the chamber wall 22. A corresponding outlet opening 28 is arranged in the plane essentially extending from the outer surface 27 of the chamber wall 22. The configuration of the scouring duct 24 is such that the lower edge 29 of the outlet opening 28 is located below the upper edge 30 of the inlet opening 26. As a result, it is ensured that, when the scouring liquid chamber 21 is full and the reservoir 2 is empty, the scouring duct 24 is closed by the atmospheric pressure acting on the water level 31 in the scouring duct 24 indicated by a broken line in FIG. 3. This causes the scouring liquid to be retained in the scouring liquid chamber 21. When the scouring liquid flows out of the scouring liquid chambers 21, the formation of a scouring surge is reinforced by the bottom 32 of the scouring chamber 21 which is downwardly inclined toward the scouring duct 24.

The ceiling 33 of the scouring liquid chamber 21 has an air inlet opening 34 with a ventilating valve 35. A vacuum blower 36 is arranged above the scouring liquid chamber 21. The vacuum blower 36 is connected at the intake side thereof to the scouring liquid chambers 21 through an intake line 37. A float valve 38 is provided at the end of each intake line 37. A branch 39 is provided at the pressure of the vacuum blower 36. One side, not shown, of the branch 39 discharges air to the outside which has been removed from the scouring liquid chamber 21 through the intake line 37. The other side 40 of the branch 39 is a pressure line connected to the ventilating valve 35.

The operation of the ventilating valve 35 and of the vacuum blower 36 is explained in the following with the aid of FIGS. 4 and 5 which show these units in detail on a larger scale and in two different phases of operation.

Figure 4:
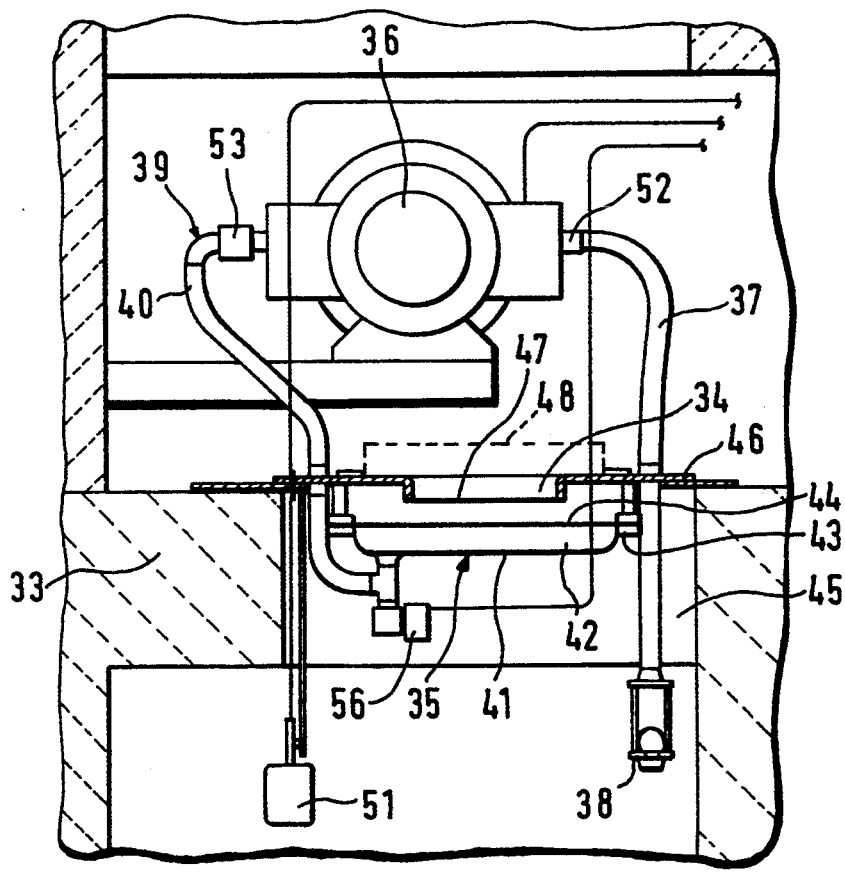
FIGS. 4 and 5 are partial sectional views showing the air inlet opening into the scouring liquid chamber at different states of operation.
Figure 5:
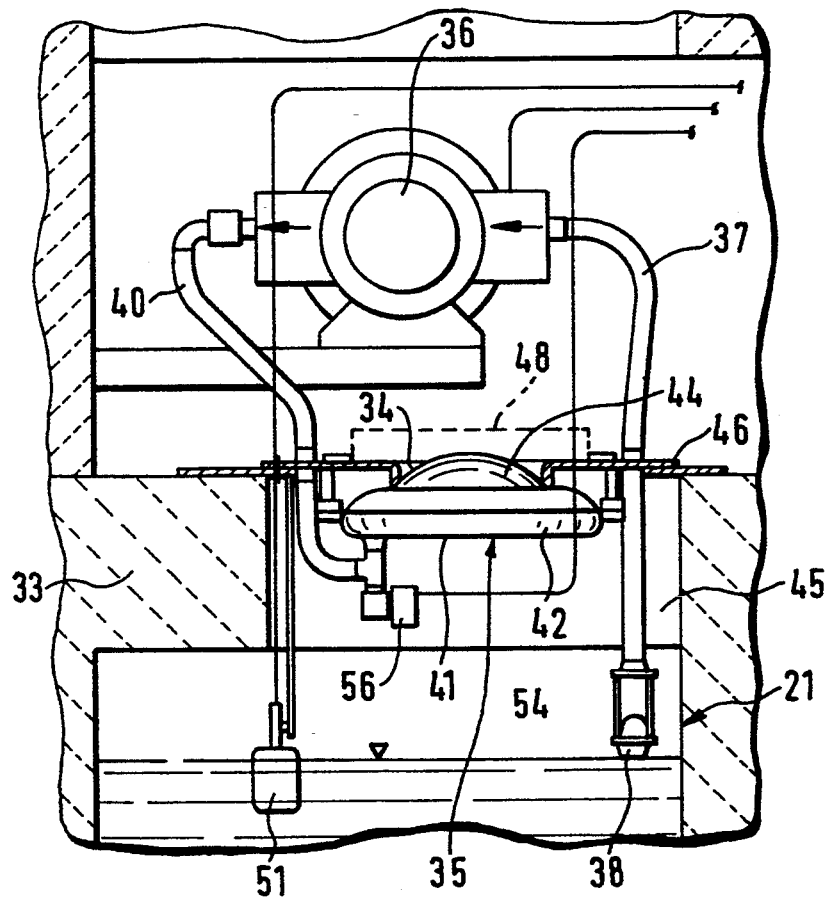

FIG. 4 of the drawing shows the stage of operation of the ventilating valve 35 when the scouring liquid chamber 21 is empty, for example, during dry weather discharge. In the illustrated embodiment, the ventilating valve 35 includes a pressure box 41 composed of a bowl-shaped, unilaterally open lower housing 42 with a lateral flange 43. The valve 35 is covered at the top by a diaphragm 44 of an elastically deformable material. The diaphragm 44 is screwed to the housing 42 in the region of the flange 43. The pressure box 41 is placed in a cutout 45 in the ceiling 33 which is otherwise closed by a cover 46 of steel. The cover 46 forms in the central area thereof the air inlet opening 34 with a valve seat 47. The air inlet opening 34 is protected toward the top by a grate-like cover 48.

The scouring system according to the present invention further includes two sensors 49 and 50 in the area of the scouring sump 16 as well as another sensor 51 in the scouring liquid chamber 21 which serves to control the water level within each chamber, as is clear from FIG. 1. In the simplest case, the sensors are float switches.

The operation of the scouring system according to the present invention is explained in the following.

When the reservoir 2 is filled with water during rainfall, as illustrated in FIG. 1, the sensor 49 responds when a certain water level is reached and switches on the vacuum blower 36. The sensor 49 is located at a level above the basin bottom 3 which is somewhat higher than the level of the water level 31 in the scouring duct 24. This ensures that the water volume in the reservoir 2 is sufficient to fill the scouring liquid chambers 21 at least once.

The vacuum blower 36 removes air from the scouring liquid chambers 21 through the intake lines 37. A premature pressure compensation is prevented by a check valve 52. The air removed from the scouring liquid chambers 21 is conducted through the pressure line 40 initially to act on the pressure box 41, so that the diaphragm 44 assumes the shape illustrated in FIG. 5 and closes the air inlet opening 34 in the region of the valve seat 47. The pressure line 40 also has a check valve 43. During further operation of the vacuum blower 36, the air removed from the scouring liquid chambers 21 is conducted to the outside through the branch 39.

Since the scouring duct 24 is closed in the above-described manner, the water level rises in the scouring liquid chamber 21 with increasing negative pressure until the water level reaches the sensor 51 which switches off the vacuum blower 36. The maximum water level reached in this manner is designated in FIG. 3 by reference numeral 54. The sensor 51 additionally makes it possible to again switch on the vacuum blower 36 when the water level in the scouring liquid chamber 21 drops, for example due to leakage losses, so that these leakage losses are compensated and with a fully filled scouring liquid chamber is available for scouring procedures.

The water level in the reservoir 2 may rise to a maximum level indicated by reference numeral 55 before the overflow 19 becomes effective.

When the reservoir 2 is slowly emptied, the vacuum blower 36 is switched off. The fact that the reservoir 2 is completely empty is registered by the sensor 50 arranged at the lowest point of the scouring sump 15 and the sensor 50 then initiates the scouring procedure. For this purpose, the sensor 50 causes a solenoid valve 56 in the pressure line 40 to the ventilation valve 35 to be opened, so that a pressure compensation between the pressurized zone and the vacuum zone is carried out. As a result, the pressure on the pressure box 41 is released and the diaphragm 44 returns into its initial position or position of rest illustrated in FIG. 4. This causes the air inlet opening 35 to be opened suddenly and the contents of the scouring liquid chamber 21 are discharged from the scouring liquid chamber in a sudden flow.

Of course, the steps described above which are automated in the above-described manner can also be controlled manually.

The scouring system according to the present invention is not limited to the above-described rectangular or classic shape of a flood basin. Rather, since the geometry of the structure is very simple, the system can be adapted to all possible basin shapes and channel reservoirs.

The invention is not limited by the embodiments described above which are presented as examples only but can be modified in various ways within the scope of protection defined by the appended patent claims.

I claim:

1. A scouring system for automatically scouring an empty liquid reservoir, the scouring system comprising at least one scouring liquid chamber arranged at an area of a highest point of a floor of the liquid reservoir, the scouring liquid chamber having a ceiling for closing the chamber in an air-tight manner, the scouring liquid chamber further having a siphon-like scouring duct with an inlet opening in communication with the scouring liquid chamber and an outlet opening in communication with the liquid reservoir, an upper edge of the inlet opening being located below a lower edge of the outlet opening, the scouring liquid chamber further comprising an air outlet opening with a check valve for discharging air displaced during filling of the scouring liquid chamber, an air inlet opening of the scouring liquid chamber, the air inlet opening defining a valve seat, a valve member for closing the air inlet opening and for opening the air inlet opening for initiating a scouring procedure, the valve member comprising a diaphragm of an elastically deformable material, means for applying increased pressure to the diaphragm for pressing the diaphragm from inside the scouring liquid chamber against the valve seat for closing the air inlet opening, and a pressure compensating line with a control valve connecting the means for applying increased air pressure with the liquid reservoir.

2. The scouring system according to claim 1, wherein the diaphragm is connected to a unilaterally open housing part, the diaphragm and the housing part forming a pressure box connected to the means for applying increased pressure, the pressure compensating line being connected to the pressure box.

3. The scouring system according to claim 2, comprising a vacuum blower connected to the scouring liquid chamber for removing air from the scouring liquid chamber.

4. The scouring system according to claim 3, comprising means for applying compressed air to the pressure box from the vacuum blower.

* * * * *